United States Patent [19]

Brown

[11] Patent Number: 5,676,748
[45] Date of Patent: *Oct. 14, 1997

[54] BULKING AND OPACIFYING FILLERS FOR PAPER AND PAPER BOARD

[75] Inventor: Alan J. Brown, Vancouver, Wash.

[73] Assignee: Columbia River Carbonates, Woodland, Wash.

[ * ] Notice: The term of this patent shall not extend beyond the expiration date of Pat. No. 5,653,795.

[21] Appl. No.: 581,056

[22] Filed: Dec. 29, 1995

[51] Int. Cl.$^6$ .................................................. C09C 1/02
[52] U.S. Cl. ..................... 106/469; 106/416; 106/419; 106/437; 106/445; 106/447; 106/448; 106/460; 106/464; 106/465; 106/471; 106/491; 162/135
[58] Field of Search ........................... 106/416, 419, 106/437, 445, 447, 448, 460, 465, 464, 469, 471, 491; 162/135

[56] References Cited

U.S. PATENT DOCUMENTS

| | | | |
|---|---|---|---|
| 2,176,876 | 10/1939 | Alessandroni | 106/423 |
| 3,014,836 | 12/1961 | Proctor, Jr. | 162/181.8 |
| 3,663,461 | 5/1972 | Witt | 528/405 |
| 3,804,656 | 4/1974 | Kaliski et al. | 106/487 |
| 4,026,762 | 5/1977 | Bauman | 162/181.2 |
| 4,028,173 | 6/1977 | Olson | 162/181.2 |
| 4,076,548 | 2/1978 | Bundy et al. | 106/416 |
| 4,078,941 | 3/1978 | Bundy et al. | 106/409 |
| 4,115,187 | 9/1978 | Davidson | 162/168 R |
| 4,167,420 | 9/1979 | Linden et al. | 106/447 |
| 4,167,421 | 9/1979 | Linden et al. | 106/447 |
| 4,174,279 | 11/1979 | Clark et al. | 210/736 |
| 4,381,948 | 5/1983 | McConnell et al. | 106/416 |
| 4,610,801 | 9/1986 | Matthews et al. | 252/181 |
| 4,714,603 | 12/1987 | Vanderheiden | 423/432 |
| 4,732,748 | 3/1988 | Stewart et al. | 423/420 |
| 4,738,726 | 4/1988 | Pratt et al. | 109/487 |
| 4,824,654 | 4/1989 | Ota et al. | 423/432 |
| 4,888,160 | 12/1989 | Kosin et al. | 423/430 |
| 4,892,590 | 1/1990 | Gill et al. | 106/464 |
| 4,900,533 | 2/1990 | Malden | 423/430 |
| 4,943,324 | 7/1990 | Bundy et al. | 106/486 |
| 5,006,574 | 4/1991 | Sennett et al. | 523/351 |
| 5,068,276 | 11/1991 | Suitch et al. | 524/413 |
| 5,076,846 | 12/1991 | Buri et al. | 106/401 |
| 5,082,887 | 1/1992 | Brown et al. | 524/413 |
| 5,112,782 | 5/1992 | Brown et al. | 501/144 |
| 5,169,441 | 12/1992 | Lauzon | 106/416 |
| 5,203,918 | 4/1993 | Rice | 106/486 |
| 5,207,822 | 5/1993 | Manasso et al. | 106/416 |
| 5,236,989 | 8/1993 | Brown et al. | 524/413 |
| 5,261,956 | 11/1993 | Dunaway et al. | 106/416 |

(List continued on next page.)

FOREIGN PATENT DOCUMENTS

| | | |
|---|---|---|
| 2016498 | 9/1979 | United Kingdom . |
| 2125838 | 3/1984 | United Kingdom . |
| WO91/08341 | 6/1991 | WIPO . |

OTHER PUBLICATIONS

Passaretti, et al., "Application of High–Opacity Precipitated Calcium Carbonate," *Tappi Journal* 76:135–140 (1993) (No Month).

*Primary Examiner*—Mark L. Bell
*Assistant Examiner*—Scott L. Hertzog
*Attorney, Agent, or Firm*—Klarquist Sparkman Campbell Leigh & Whinston, LLP

[57] ABSTRACT

A method for producing bulking and opacifying kaolin fillers for filling cellulosic products is disclosed. An aqueous slurry of anionically dispersed kaolin particles is formed at 1 to 30% solids. A low-molecular-weight cationic aggregating agent is then added to the dispersed slurry to selectively aggregate fine and ultra-fine particles. The resultant aggregates are of larger mean particle size than the feed material and contain little or no fine and ultra-fine or colloidal particles. The net charge present on the aggregated particles is lower than that of the feed material. The aggregated structure contains within it a labyrinth of internal voids or pores. These mineral aggregates are then of a suitable size and surface charge to be retained well in a fiber web, and provide added bulk and opacity to the cellulosic products.

28 Claims, 6 Drawing Sheets

U.S. PATENT DOCUMENTS

| | | | |
|---|---|---|---|
| 5,279,663 | 1/1994 | Kaliski | 106/486 |
| 5,298,066 | 3/1994 | Shurling, Jr. et al. | 106/487 |
| 5,317,053 | 5/1994 | Brown et al. | 524/425 |
| 5,320,672 | 6/1994 | Whalen-Shaw | 106/287.24 |
| 5,336,311 | 8/1994 | Curtis et al. | 106/416 |
| 5,384,013 | 1/1995 | Husband et al. | 106/416 |

BULKING AND OPACIFYING FILLERS FOR PAPER AND PAPER BOARD

FIELD OF THE INVENTION

The present invention concerns a method for forming fillers comprising kaolin and/or talc for use in cellulosic products, and products made using the fillers.

BACKGROUND TO THE INVENTION

Mineral particles, such as kaolin, talc, titanium dioxide or aluminium hydroxide are often used as fillers and pigments for making cellulosic products, such as paper and paper board. These inorganic materials are incorporated into the fibrous web in order to improve the quality of the cellulosic product. Without such fillers, cellulosic products have poor texture due to discontinuities in the fibrous web. Moreover, the printing characteristics, opacity, brightness and bulk of the cellulosic product all benefit by additions of fillers.

Fillers improve printing characteristics of paper or paper board products by improving surface smoothness, and improving the opacity and brightness of a sheet of paper of a given weight. Additionally, fillers increase the bulk of the cellulosic product, which is important because paper is sold by area, not by weight. Bulky paper can be calendered or "finished" more than thin paper to produce a smoother sheet, which prints better.

However, the web strength of paper products generally declines as filler is substituted for fiber. Preferred fillers are therefore chosen to have minimal impact on fiber-to-fiber bonds, while maintaining the strength of the paper web, particularly at high filler levels. There are two basic mechanisms that control retention of a filler in a paper web. These mechanisms are filtration and adsorption retention.

The properties which make inorganic materials valuable as fillers are known. They include low abrasion, as well as high brightness and opacifying characteristics. Low abrasion is required so that the cellulosic product can be manufactured easily with conventional machinery. The brightening and opacifying characteristics are important in producing paper or board products which incorporate whiteness, high opacity, good printability and an optimum bulk/weight ratio. The brightness and opacifying characteristics of a filler when incorporated in a sheet of paper may be quantitatively related to a property of the filler known as the "scattering coefficient" or "S." The scattering coefficient is routinely considered in papermaking and has been the subject of many technical papers.

A frequently used filler is titanium dioxide, which can be incorporated into the paper in the form of anatase or rutile. Titanium dioxide has a higher refractive index than other naturally occurring minerals or cellulose fiber and therefore increases the opacity of the paper. However, titanium dioxide is expensive and very abrasive. Thus, despite titanium dioxide's effectiveness as an opacifying filler, its use as a filler is limited and cheaper more satisfactory replacements are desired.

Calcined kaolins are another class of materials used as fillers in papermaking. However, calcined kaolins have higher abrasion than natural or un-calcined kaolins, and are relatively expensive to produce. This limits the applicability of calcined kaolin materials as paper fillers. Calcined kaolins, because of their low bulk density, also disrupt the fiber-to-fiber bonds of the paper web at high filler loads, thereby significantly weakening the strength of a sheet of paper relative to other higher bulk density fillers.

Calcined kaolin fillers are much more hydrophobic than regular or hydrous kaolin mineral particles. As a consequence of this surface hydrophobicity, post calcining processing steps must be taken to aid the dispersion of the pigment in water. The porous nature of calcined clays results in mineral slurries that are dilatant at high solids.

The inorganic materials valuable as fillers typically are mixtures of particles that have a significant portion of the mineral particulates in the fine and ultra-fine range (i.e., particles having equivalent spherical diameters of less than about 0.5 µm). Fine and ultra-fine mineral particles are not useful in filler materials for cellulosic products as such small particles are not retained well within the fibrous web, do not scatter light sufficiently to aid in paper opacity, retard drainage, give a low bulk to weight ratio, and disrupt the fiber-to-fiber bonds of the paper web at high filler loads resulting in low sheet strength.

SUMMARY OF THE INVENTION

The present invention concerns a method for forming fillers for filling cellulosic products, such as paper and paper board. The method, and products made by the method, address many of the shortcomings of known fillers.

In general, the method comprises first providing an aqueous slurry comprising from about 1 percent to about 30 percent solid mineral particles by weight. The mineral particles are selected from the group consisting of hydrous kaolin, talc, aluminum hydroxide and mixtures thereof. Best results are achieved when using only hydrous kaolin mineral particles which have low abrasion characteristics and are relatively inexpensive.

In suitable, commercially available mineral products, typically the mineral particles are in a mixture that includes "coarse particles" (particles having an equivalent spherical diameter of at least about 0.5 microns) and "fine particles" (particles having an equivalent spherical diameter of less than about 0.5 microns). Of the fine particles in such mixtures, typically some are "ultra-fine particles" (particles having an equivalent spherical diameter of less than about 0.2 microns).

The mixtures contain particles that are sufficiently small in size to be useful as fillers or pigments for making paper and paper board. It is typical for such mixtures to contain about 70 percent by weight of the mineral particles having an equivalent spherical diameter of less than about two microns, with at least 35 percent of the mineral particles having an equivalent spherical diameter of less than about 0.3 microns. Best results are achieved when at least 30 percent by weight of the mineral particles have an equivalent spherical diameter of less than about two microns. As used herein, the terms "particle size" and "equivalent spherical diameter" refer to the particle size reading obtained from measuring mineral particle size with a Micromeritics SEDIGRAPH® Model 5100 particle size analyzer.

The invention is practiced using an anionically dispersed suspension of the mineral particles wherein the dispersed suspension has a bulk anionic charge. An aqueous suspension of mineral particles can be anionically dispersed by adding anionic dispersing agents to the suspension. The anionic dispersant generally is selected from the group consisting of homopolymers or copolymers of acrylic acid, methacrylic acid or any carboxylic acid or sulfonic acid containing vinyl monomer, tetrasodium pyrophosphate, other polyphosphate materials, and sodium silicate and mixtures thereof.

A low-molecular-weight cationic aggregating agent is then added to the anionically dispersed aqueous slurry of mineral particles. The aggregating agent is added in an amount sufficient to selectively aggregate fine particles (particles having an equivalent spherical diameter of less than about 0.5 microns) and ultra-fine particles (particles having an equivalent spherical diameter of less than about 0.2 microns) present in the slurry.

Low-molecular-weight aggregating agents useful for practicing the present invention typically have molecular weights, without limitation, of from about 10,000 to about 500,000. The aggregating agent is selected to have a charge opposite the bulk charge of the slurry and is thus, cationically charged.

As used herein, the phrase "selective aggregation" refers to a change in particle size distribution of the dispersed mineral slurry. This change in particle size distribution occurs upon addition of the selective aggregating agent because the combined weight of all particles having diameters of less than 0.2 micron is reduced to below about 20 percent of the total weight of the mineral particles in the slurry. For best results, selective aggregation reduces the weight fraction of particles measuring less than 0.2 micron in equivalent spherical diameter to be below about 10 percent of the total weight of mineral particles in the suspension. The phrase "non-selective aggregation" refers to a composition in which the combined weight of fine particles having diameters of less than 0.2 micron is not reduced to be less than about 30 percent of the total weight of mineral particles in the suspension.

The low-molecular-weight selective aggregating agent generally is selected from the group consisting of poly alkyl diallyl quaternary ammonium salts, quaternary ammonium cationic polymers obtained by copolymerizing aliphatic secondary amines with epichlorohydrin, poly (quaternary ammonium) polyether salts that contain quaternary nitrogen in a polymeric backbone chain extended by ether groups, polyamines, copolymers of acrylamide with cationic vinyl monomers, dimethylamine epichlorohydrine copolymers, dimethyldiallylammonium chloride homopolymer, dimethyldiallylammonium chloride copolymer, divalent metal ion salts, trivalent metal ion salts polyethyleneimine polyelectrolytes and mixtures thereof. Best results are achieved when using cationically charged, low-molecular-weight aggregating agent dimethyl ammonium chloride homopolymer.

Divalent metal ion salts useful as selective aggregating agents may be selected from the group of salts consisting of calcium, magnesium, nickel, manganese, copper, zinc and tin salts, and mixtures thereof. For example, the divalent metal ion salt may be selected from the group of salts consisting of magnesium chloride, calcium chloride, magnesium hydroxide, calcium hydroxide, magnesium nitrate, calcium nitrate, and mixtures thereof. The trivalent metal ion salt generally is selected from the group of salts consisting of aluminum, iron, chromium and titanium salts, and mixtures thereof. For example, the trivalent metal ion salt may be selected from the group consisting of aluminum sulphate, polyaluminum chloride, sodium aluminate, and mixtures thereof.

The amount of the selective aggregating agent added to the anionically dispersed suspension may vary, and is best determined by considering the characteristics desired in the suspension and the cost of the aggregating agent. However, by way of example, the selective aggregating agent may be added to the slurry of ionically dispersed mineral particles in an amount of from 5 lbs/ton to about 50 lbs/ton of mineral particles, preferably from about 15 lbs/ton to about 25 lbs/ton. However, with some selective aggregating agents, there is little benefit realized from adding amounts greater than about 20 lbs/ton to the dispersed suspension of mineral particles.

A working embodiment of the method for producing kaolin fillers comprises first providing an anionically dispersed aqueous slurry comprising from about 1 percent to about 20 percent kaolin mineral particles by weight. Best results are achieved when the aqueous slurry comprises from about 1 percent to about 10 percent kaolin. The slurry can be purchased as an anionically dispersed slurry, or the method may include the step of adding an anionic dispersing agent to a mineral suspension to provide an anionically dispersed slurry. A concentrated (i.e., solids more than 70% by weight) anionically dispersed mineral particle slurry may be shipped directly to the paper mill.

The slurry is then selectively aggregated with a cationic low-molecular-weight selective aggregating agent. Five lb/t to 25 lbs/t of the aggregating agent is added to the dispersed aqueous slurry to selectively aggregate fine and ultra-fine particles present in the slurry. The aggregating agent is selected as discussed above.

The present invention also provides a filler suspension for filling paper and paper board. A working embodiment of the filler suspension comprises an anionically dispersed mineral suspension comprising from about 1 percent to about 20 percent kaolin mineral particles, and preferably from 5 lbs/t to about 25 lbs/t of dimethyldiallylammonium chloride homopolymer.

The process of selectively aggregating the fine and ultrafine particles in a mineral suspension produces aggregates. The aggregates have a larger mean particle size than the feed mineral slurry, and little or no fine or colloidal particles are free in suspension after aggregation. The net charge present on the aggregated particles is lower than that of the feed material. The mineral aggregates produced upon addition of the selective aggregating agent have a suitable size and surface charge to be retained well in a fiber web by a combination of filtration retention and adsorption retention. Moreover, the mineral aggregates provide added bulk and opacity to the finished sheet of paper.

One of the many advantages of this invention is that there is no need to concentrate and/or remove fine particles or selectively aggregated particles, prior to use as fillers for cellulosic products. A filler slurry can be cost effectively shipped in concentrated, high solids form (i.e., more than 30% solids by weight) to the paper mill. The slurry is then diluted on-site at the paper mill from the high solids, anionically dispersed (if not received in an anionically dispersed form) and selectively aggregated with a low-molecular-weight aggregating agent. A slurry so prepared is then added or metered directly to the fiber furnish without further modification.

The present invention most effectively uses all of the particles present in a dispersed mineral slurry so that the bulk of the sheet of paper and its opacity are significantly enhanced. Since the fine particles do not need to be removed and, as aggregated particles add bulk to the filler, the present invention offers a tremendous reduction in cost. The combination of low specific surface area of the aggregated mineral fillers of this invention and low internal porosity provides maximum drainage to the fiber web with minimal impact on fiber-to-fiber bonding, or sheet strength. This combination of properties minimizes the drying demand of a paper machine while ensuring that high production rates can be maintained.

DESCRIPTION OF PREFERRED EMBODIMENTS

Figure 1:
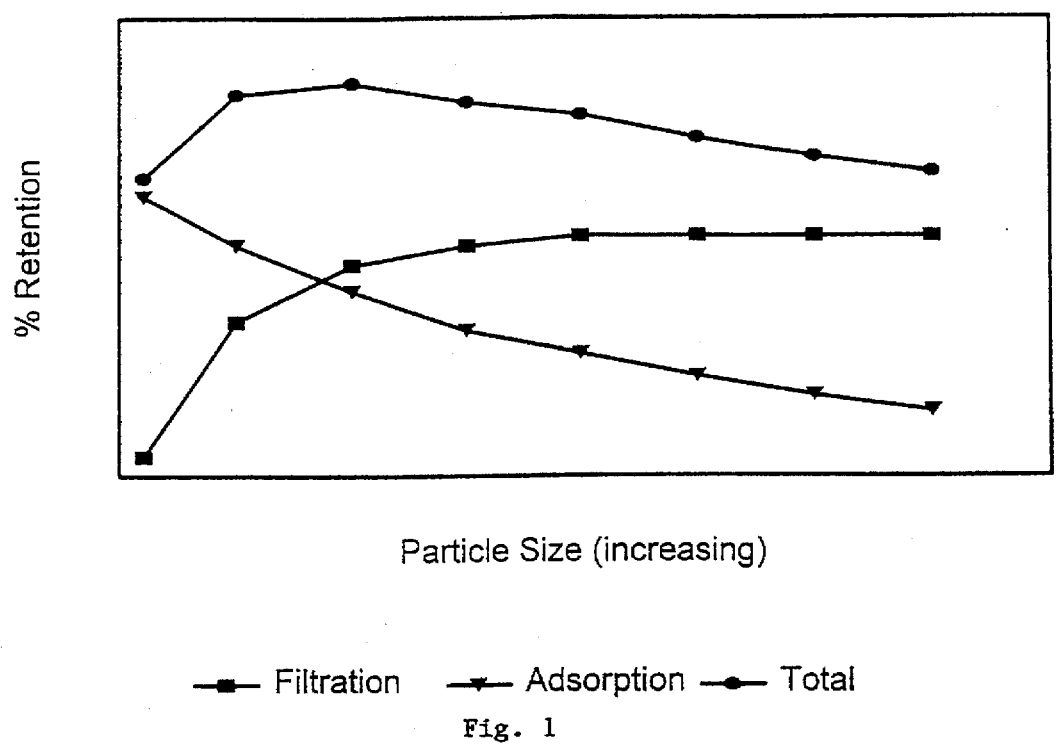
FIG. 1 is a graph of particle size in microns versus percent retention which illustrates the impact of filler particle size on the two retention components; filtration and adsorption.

The present invention concerns fillers that are used to make cellulosic products and methods for the production of such fillers. The fillers are formed from anionically dispersed aqueous suspensions of mineral particles.

I. MINERAL PARTICLE SLURRIES

Water is mixed with particles of minerals, selected from the group consisting of hydrous kaolin, talc, aluminium hydroxide, and mixtures thereof, to form an aqueous slurry.

Such mineral slurries generally consist of a dispersion of naturally ground mineral particles having a range of particle sizes. A "coarse" fraction of mineral particles is defined as that fraction of the particles having an equivalent spherical diameter of at least 0.5 micron. A "fine" fraction of the mineral particle slurries is defined as that fraction of the particles having an equivalent spherical diameter of less than about 0.5 microns. An "ultra-fine" or "colloidal" fraction is defined as that component of the particles having an equivalent spherical diameter of less than about 0.2 microns.

Preferably, substantially all of the particles of the feed mineral material will have an equivalent spherical diameter of less than about 20 microns. In such a slurry of mineral particles, wherein about ninety percent by weight of the particles are finer than two microns, about sixty-five percent by weight of the particles are typically in the fine range. The absolute value of the fines content of a given feed slurry of mineral particles will necessarily depend upon the method of its production and typically, the fines content relates to the mean particle size of the feed mineral slurry.

The present invention is most useful when a mineral particle slurry contains at least thirty percent by weight of particles having an equivalent spherical diameter of less than two microns. The fines content of these mineral slurries can include greater than ten percent by weight of particles having equivalent spherical diameters smaller than 0.5 microns. Particularly goods results are achieved with a slurry of mineral particles having at least about seventy percent of the mineral particles finer than two microns and with at least about thirty-five percent of the particles finer than 0.3 microns.

Slurries having solids concentrations such as from 1% to about 30%, which have been produced on-site at a paper mill or at a central production facility and transported to a paper mill, are the best feed materials for practicing this invention.

Slurries of these minerals can be shipped to paper mills at high solids concentration, such as, for example, concentrations of from about 70% to 76% to provide an affordable supply of the mineral feed material used in this invention. The aqueous mineral slurry may then be diluted to a solids range of from about one to about thirty percent by weight at the site where it is to be used.

Best results are achieved with a slurry having a solids content in the range of from about 1 to about 15 percent by weight, with about 10 to 15 percent solids being preferred. Diluting the aqueous mineral slurry to about 10 to 15 percent solids by weight or less facilitates selective aggregation (i.e., aggregating the fine particles without also aggregating particles of other sizes) of the fine particles, which possess most of the available surface area.

II. ANIONIC DISPERSION

The mineral slurries used to practice the invention are anionically dispersed. Anionically dispersed mineral suspensions can be purchased commercially from such vendors as Columbia River Carbonates of Woodland, Wash., U.S.A. Alternatively, dispersing agents can be added to an aqueous mineral particle slurry to anionically disperse the particles.

Low solids mineral slurries may naturally carry a net negative surface charge or may be dispersed with an anionic polyelectrolyte dispersant. The term "polyelectrolyte" (or "ionically charged agent") as used herein refers to a polymer or molecular species with a net positive or a net negative charge. Anionically charged agents have an excess of electrons or electron density.

The anionic dispersing agents used to practice the present invention generally are homopolymers or copolymers of carboxylic or sulfonic acid containing vinyl monomers, such as acrylic acid and methacrylic acid, tetrasodium pyrophosphate, sodium silicate and other polyphosphate materials.

As used herein, the term "polymer" refers to macromolecules formed by the chemical union of five or more combining units called monomers. Also as used herein, the term "copolymer" refers to a polymer comprised of two or more dissimilar monomers, and the term "homopolymer" refers to synthetic or natural polymers formed from a single monomer. The homopolymers or copolymers used as anionic dispersing agents typically have molecular weights in the range of from about 1,000 to about 10,000, with a preferred molecular weight being about 5,000.

For best results the anionic dispersing agents are homopolymers or copolymers comprising one or more of acrylic acid, methacrylic acid, carboxylic acid containing vinyl monomers and sulfonic acid containing vinyl monomers. Currently, best results are achieved with tetrasodium pyrophosphate (TSPP) as the anionic dispersing agent.

The polymers of acrylic acid, methacrylic acid and carboxylic acid containing vinyl monomers may be represented by Formula (1):

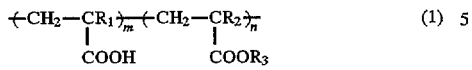

wherein $R_1$–$R_3$ are independently selected from the group consisting of hydrogen and lower alkyl groups, so that when $R_1$ is hydrogen and $R_2$ is a lower alkyl, these are acrylic acid copolymers, when $R_1$ and $R_2$ are both hydrogen, these are acrylic acid homopolymers and when $R_1$ is a methyl group, these are methacrylic acid copolymers. As used herein, the term "lower alkyl" refers to compounds having eight or fewer carbon atoms and includes both straight chain and branched chain compounds.

The copolymers of sulfonic acid containing vinyl monomers may be represented by Formula (2):

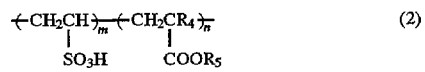

wherein $R_4$ and $R_5$ are independently selected from the group consisting of hydrogen and lower alkyl groups.

III. AGGREGATION

A low-molecular-weight cationically charged selective aggregating agent is added to the anionically dispersed mineral particle slurry to aggregate the fine particles. The cationic agent, selected to have a charge opposite that of the anionically dispersed slurry, is added in an amount sufficient to cause the fine particles to selectively aggregate. Combinations of plural cationic aggregating agents also can be used to aggregate the fines.

The amount of the selective aggregating agent added to the anionically dispersed mineral slurry varies depending upon factors such as the nature of the mineral particles used, the concentration of the mineral particles in the slurry and the nature of the aggregating agent. However, it appears that the best operation occurs with the addition of at least 5 lbs, up to about 50 lbs aggregating agent per ton of mineral solids, preferably 5 lbs/ton to about 30 lbs/ton. Higher amounts can be used without detrimental effects. Best results are achieved by way of full selective aggregation when at least about 20 lbs/ton of aggregating agent are added.

The following paragraphs discuss particular aggregating agents that have been found to be useful in the practice of the invention. The particular aggregating agents discussed are intended to be illustrative only. It should be understood that any aggregating agent, now known or hereinafter developed, can be used to practice the invention. Such agents must, however, selectively aggregate fine mineral particles in the manner discussed herein, and not detract from the use of the treated slurries for the production of cellulosic products.

The anionically dispersed mineral slurries used to practice the present invention can be selectively aggregated using cationic polyelectrolytes. Cationically charged agents have a deficiency of electrons or electron density.

The cationic aggregating agent preferably has a low molecular weight, such as from about 1,000 to about 20,000, and from about 5,000 to about 10,000 producing best results. Water-soluble, polymeric, cationically charged agents are well known in the art. Generally, such materials do not contain negatively charged or electronically polarized groups, such as carboxyl or carbonyl groups.

One example of a class of cationic aggregating agents is poly (quaternary ammonium) compounds, such as poly (alkyl diallyl quaternary ammonium) salts. In addition to poly (alkyl diallyl quaternary ammonium) salts, other suitable quaternary ammonium cationic polymers can be obtained by copolymerizing aliphatic secondary amines with epichlorohydrin. Still other water-soluble cationic polyelectrolytes are poly (quaternary ammonium) polyether salts that contain quaternary nitrogen in a polymeric backbone and are chain extended by ether groups. These compounds are prepared from water-soluble poly (quaternary ammonium) salts containing pendant hydroxyl groups and bifunctionally reactive chain extending agents; such polyelectrolytes are prepared by treating an N,N,N,N-tetralkyl-hydroxyalkenediamine and an organic dihalide such as dihydroalkane or a dihaloether with an epoxy haloalkane. See U.S. Pat. No. 3,663,461 for the synthesis of poly (quaternary ammonium) polyether salts, which patent is incorporated herein by reference. Polyamines, copolymers of acrylamide with cationic vinyl monomers, dimethylamine, epichlorohydrin copolymers, dimethyldiallyammonium chloride homopolymers and copolymers, divalent and trivalent metal ion salts and polyethyleneimines are also currently preferred.

A. Alkyl Diallyl Quaternary Ammonium Salts

Polymers of alkyl diallyl quaternary ammonium salts may be represented by Formula (3):

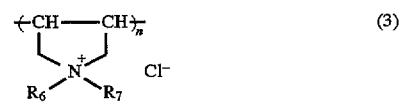

wherein $R_6$ and $R_7$ are independently selected from the group consisting of hydrogen, methyl groups, ethyl groups and lower alkyl groups. A preferred cationically charged agent is poly(dimethyldiallylammonium chloride), which is represented by the formula above when $R_6$ and $R_7$ are methyl groups.

A poly (dimethyldiallylammonium chloride) cationic polyelectrolyte commercially available under the trademark designation Agefloc WT50 SLV from the CPS Chemical Company, having a molecular weight estimated to be between 10,000 and 50,000, has been found to be particularly useful in the present invention. However, the invention is not limited to Agefloc WT50 SLV since other cationic polyelectrolytes appear to provide equivalent, if not superior results.

Other cationic polyelectrolytes available from the CPS Chemical Company that are useful in the present invention are: Agefloc WT 40 which has a molecular weight estimated to range from 200,000 to 400,000; Agequat C1405 which has a molecular weight estimated to range from 200,000 to 400,000; Agefloc B50 which has a molecular weight estimated to range from 10,000 to 50,000; and Agefloc A50 LV which has a molecular weight estimated to range from 200,000 to 400,000.

B. Poly (quaternary ammonium) Polyether Salts

Poly (quaternary ammonium) polyether salts that contain quaternary nitrogen in a polymeric backbone and are chain extended by ether groups may be represented by Formula (4):

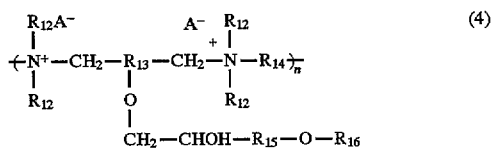

wherein $R_{12}$ is a lower alkyl group, $R_{13}$ is the residue of a hydroxy substituted lower alkylene group containing 10 or fewer carbon atoms, $R_{14}$ is an organic radical selected from the group consisting of alkylene groups containing four and fewer carbon atoms and a $(CH_2)_n$—O—$(CH_2)_3$ group where n is an integer from one to four, $R_{15}$ is an alkylene group containing one to four carbon atoms, $R_{16}$ is selected from the group consisting of terminal hydrogen and $R_{13}$, and A is an anion selected from the group consisting of chloride, bromide and iodide. For best results the polyether compounds described above would have a molecular weight in the range of 20,000 to 500,000.

C. Quaternary Ammonium Polymers from Secondary Amines Polymerized with Epichlorohydrin Polymers of quaternary ammonium monomers obtained by copolymerizing aliphatic secondary amines with epichlorohydrin may be represented by Formula (5):

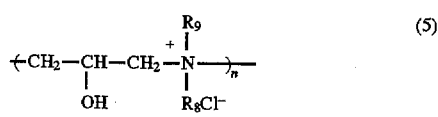

wherein $R_8$ and $R_9$ are independently selected from the group consisting of hydrogen and lower alkyl groups. Another preferred polymeric cationic polyelectrolyte is polydimethylamine/epichlorohydrin copolymer represented by Formula (5) when $R_8$ and $R_9$ are methyl groups.

D. Water-Soluble Polyamines

Other water-soluble cationic polyelectrolytes are polyamines which are usually supplied under commercial trade designations. Copolymers of acrylamide with cationic vinyl monomers or low-molecular-weight polyethyleneimine polyelectrolytes could also be used in this invention.

Suitable cationic polyelectrolyte polyamines may be represented by Formula (6):

wherein $R_{10}$ is selected from the group consisting of $NHR_2$ and $C(O)NHR_2$ and $R_{11}$ is selected from the group consisting of hydrogen and lower alkyls. Another preferred polymeric cationic polyelectrolyte is polyethyleneimine represented by Formula (6) when $R_{10}$ and $R_{11}$ are hydrogen. Another preferred polymeric cationic polyelectrolyte is polyacrylamide, represented by the Formula (6) when $R_{10}$ is hydrogen and $R_{11}$ is C(O)NH. For best results the polymer would have a molecular weight in the range of 20,000 to 500,000.

The cationic polyelectrolyte polymers have low-molecular-weight for best results. "Low-molecular-weight" as used in this context, refers to molecular weights no greater than 500,000. Cationic potato starch is reported as having an estimated molecular weight of from about 3,000,000 to about 3,500,000, while corn starch is reported as having a molecular weight ranging from about 800,000 to about 1,800,000. Because of their high molecular weights, most such cationic polyelectrolytes are not preferred for use in the present invention. However, cationic starches, cationic guar gum, or other modified polysaccharides could act as preferred aggregating agents in this invention if they are of sufficiently low molecular weight.

E. Divalent and Trivalent Salts

Salts of divalent and trivalent metal ions, such as calcium, magnesium, iron and aluminum also can be used as cationic aggregating agents. Examples of such salts include, but are not restricted to, calcium hydroxide, magnesium hydroxide, calcium nitrate, magnesium nitrate, magnesium chloride, aluminum sulphate (papermakers alum), sodium aluminate, polyaluminum chloride (PAC) and calcium chloride.

The filler materials produced as discussed above are used in the fashion of prior filler materials. For example, a filler material according to the present invention can be fed to a paper-making machine in the manner of a standard paper-making filler slurry.

The following examples are intended to be illustrative only, and should not be interpreted to limit the invention to the particular features discussed therein.

EXAMPLES

In the following examples the materials are selected from the following:

1. Mineral Particles

Windsor, an air floated kaolin clay from Kentucky-Tennessee Clay Company.

2. Artionic Polyelectrolytes

Acumer 9400, a polyacrylic acid homopolymer, from Rohm & Hass Co., of Philadelphia, Pa., U.S.A.

3. Cationic Polyelectrolytes

Dimethyldiallylammonium chloride homopolymer cationic polyelectrolytes Agefloc WT50 SLV, Agefloc WT40, dimethlydiallylammonium chloride copolymer Agequat C1405, and dimethylamine/epichlorohydrin copolymers Agefloc B50, Agefloc A50 LV from the CPS Chemical Company, Inc. of Old Bridge, N.J., U.S.A.

4. Cationic Starch

Cationic potato starch, Westcat E-F, from Western Polymer Corporation of Longwood, Fla., U.S.A.

Example 1

A sample of Windsor clay, which is an air floated kaolin product with 90% by weight of particles finer than 2 microns, 68% by weight of particles finer than 0.5 micron and 40% by weight of particles finer than 0.2 micron, is dispersed in water at 60% solids with 12 lbs/t of Acumer 9400. This feed mineral slurry may be used as a feed for all of the subsequent treatment experiments.

The feed mineral slurry is diluted to 10% solids with water and the cationic selective aggregating agent Agefloc WT50 SLV, is added to the mineral slurry at dose rates varying from 3 lbs/t to 30 lbs/t, with mixing. Agefloc WT50 SLV is a cationic selective aggregating agent with an estimated molecular weight in the range 10,000 to 50,000. The resultant products of these experiments may be analyzed for particle size distribution with a Micromeritics SEDIGRAPH®, 5100 particle size analyzer, and surface charge with a Mutek, PCD 02 Particle Charge Detector.

Figure 2:
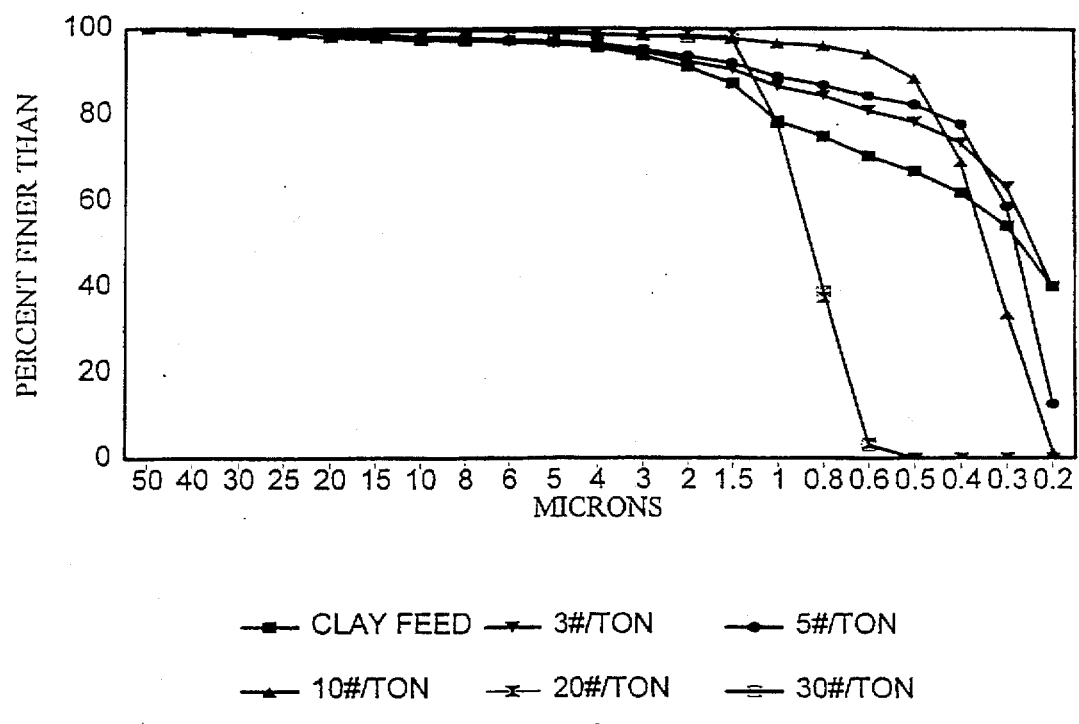
FIG. 2 is a graph of particle size in microns versus the percent of particles finer than the stated sizes which illustrates the effect of various different addition levels of the cationic polyelectrolyte Agefloc WT50 SLV on the particle size distribution curve of a 10% solids slurry of the Windsor kaolin pigment.

FIG. 2 illustrates that the cationic polyelectrolyte completely aggregates the ultra-fine particles present in the feed kaolin slurry with an amount of about 10 lbs/t. At higher amounts of about 20 and 30 lbs/t, complete aggregation of the fine particles present in the feed kaolin slurry takes place. The surface charge on the kaolin particles and mean particle size change as listed in Table I:

TABLE I

| lbs/t Polymer added | Mean particle size (microns) | Surface charge (µg/g) |
|---|---|---|
| None (feed) | 0.2 | −58 |
| 10 lbs/t | 0.3 | −30 |
| 20 lbs/t | 0.9 | −19 |
| 30 lbs/t | 0.9 | −16 |

Addition of cationic polyelectrolyte over and above 20 lbs/t does not significantly increase the mean particle size of the aggregated product, but results in a decrease in the surface charge of the product.

Example 2

Figure 3:
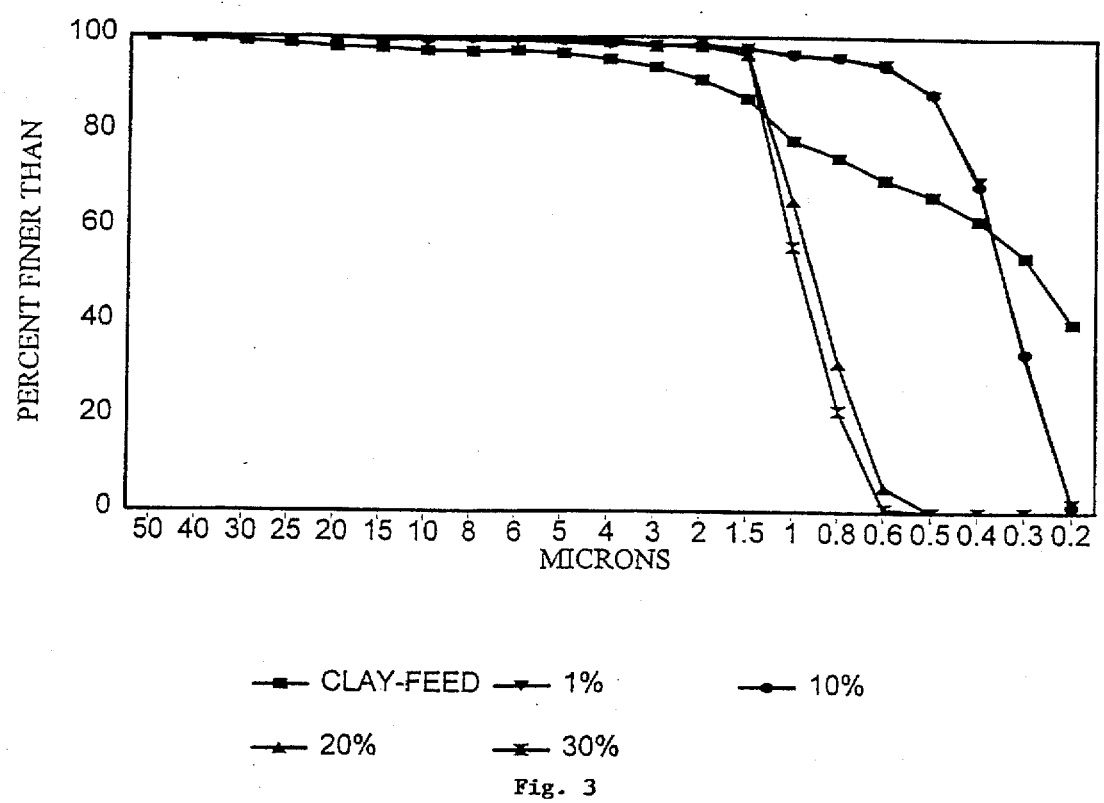
FIG. 3 is a graph of particle size in microns versus the percent of particles finer than the stated sizes which illustrates the effect of different Windsor kaolin clay feed solids on the extent of aggregation of the fine and ultra-fine particles present in the mineral suspension with the addition of 10 lbs/t of the cationic polyelectrolyte Agefloc WT50 SLV.

In this example the feed kaolin mineral slurry, as described in Example 1 above, is diluted to a range of different solids concentrations. These kaolin slurries are treated with 10 lbs/t of the low molecular weight cationic selective aggregating agent, Agefloc WT50 SLV, with stirring. The resultant products were analyzed to produce a particle size distribution curve. Results from these experiments are illustrated in FIG. 3. As the treatment solids increases, the treatment process becomes less selective, with general aggregation of the ultra-fine and fine particles expected to take place at solids levels above 10%.

Example 3

Figure 4:
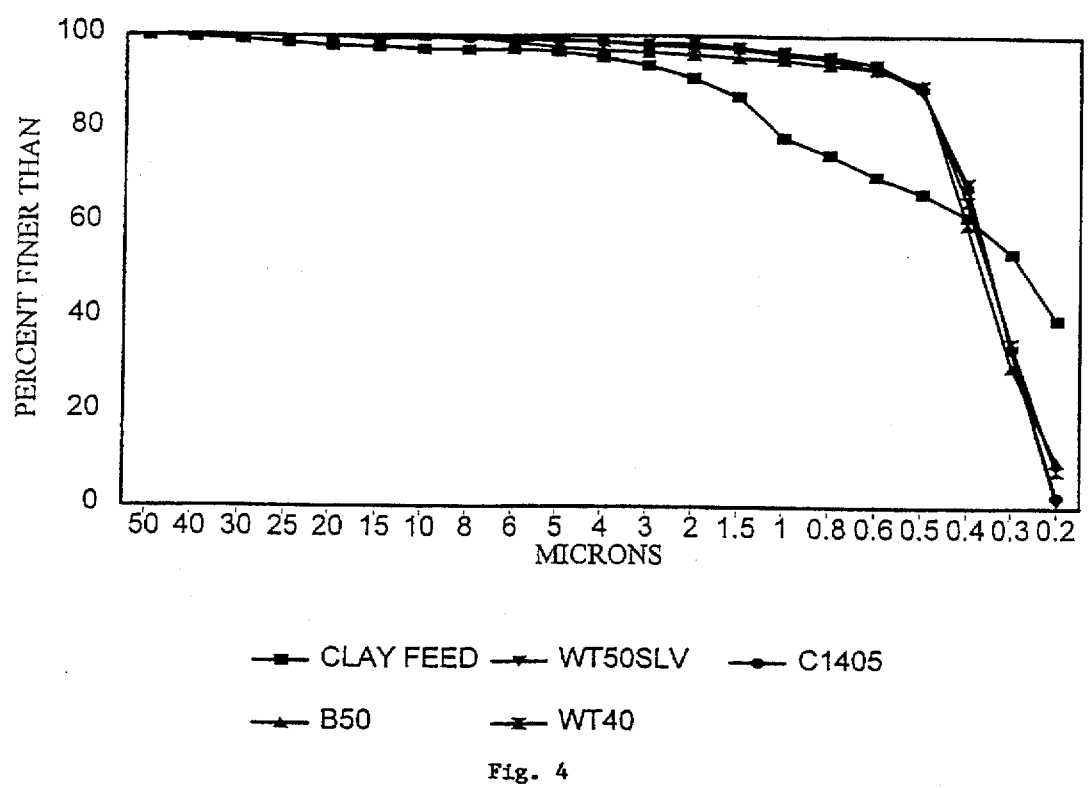
FIG. 4 is a graph of particle size in microns versus the percent of particles finer than the stated sizes which illustrates the effect of 10 lbs/t additions of various different cationic polyelectrolytes upon the particle size distribution curve of Windsor kaolin clay dispersed at 10% solids in water.

A sample of the feed kaolin mineral slurry from Example 1 above may be diluted to 10% solids and treated with a range of differing cationic select aggregating agent with molecular weights ranging from 10,000 to 400,000. The cationic selective aggregating agent are added to the kaolin slurry with mixing. FIG. 4 shows that the ultra-fine particles present in a kaolin slurry are selectively aggregated with a variety of differing cationic selective aggregating agent. The mean particle size (i.e., the particle size (or equivalent spherical diameter) in microns at which 50 wt. % of the particles are finer than the other 50 wt. % of the particles)) of all of the treated products is at least about 0.3 microns and is greater than the mean particle size of the feed mineral slurry. The particle surface charge of the aggregated products is lower than that of the feed mineral slurry as described in Example 2 above.

Example 4

Figure 5:
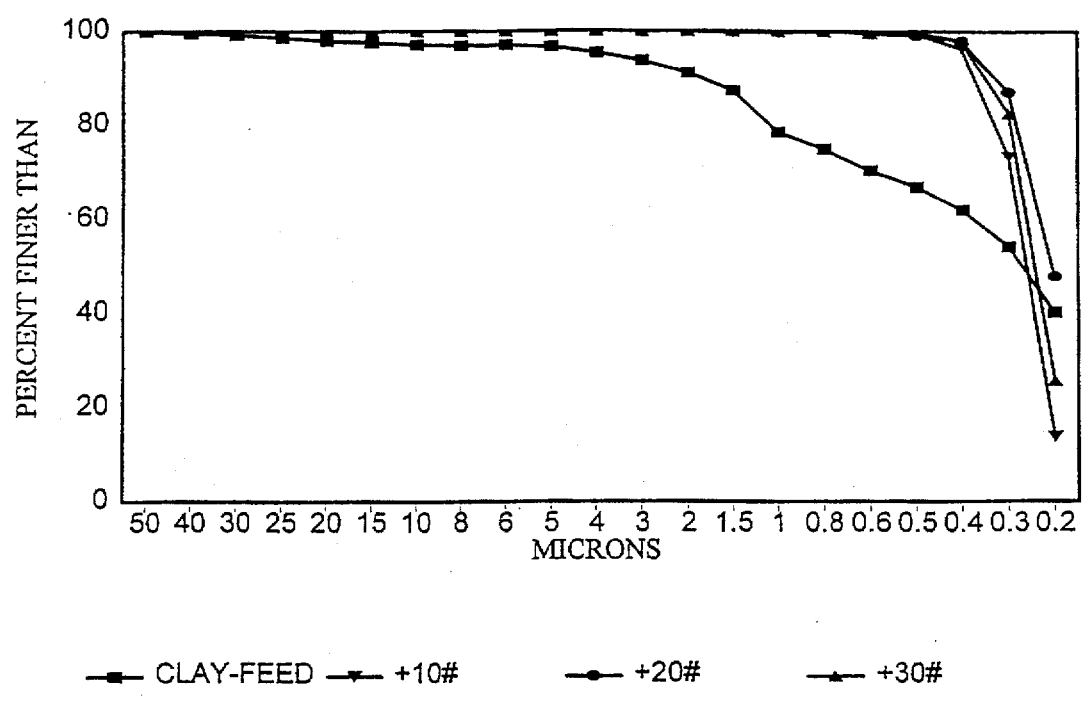
FIG. 5 is a graph of particle size in microns versus the percent of particles finer than the stated sizes which illustrates the effect of increasing additions of alum on the aggregation of the fines and ultra-fines present in a 10% solids suspension of the kaolin mineral Windsor.

A sample of the feed kaolin mineral slurry from Example 1 above may be diluted to 10% solids and treated with varying amounts alum. FIG. 5 shows that the ultra-fine particles present in a kaolin slurry are selectively aggregated when alum is used as the cationic aggregating agent.

TABLE II

| Alum addition (lbs/t) | Surface charae (µeg/g) |
|---|---|
| None (feed) | −58 |
| 20 lbs/t | −41 |
| 30 lbs/t | −28 |
| 40 lbs/t | −20 |

Table II shows that the particle surface charge decreases as the amount of alum (i.e., selective aggregating agent) added to the mineral particle slurry is increased. This is the same effect as the addition of the cationic selective aggregating agent Agefloc WT50 SLV described in Example 1 above.

Example 5

Ten and thirty lbs/t of the high molecular weight cationic agent, Westcat E-F, are added to a 10% solids aqueous dispersion of Windsor kaolin clay. Windsor is a commercially available air floated kaolin clay which has 90% by weight of particles finer than two microns, 68% by weight of particles finer than 0.5 micron and 40% by weight of particles finer than 0.2 micron. Westcat E-F, which is a cationic starch, has an estimated molecular weight between 3,000,000 and 3,500,000. The particle size distribution curve of the resultant products may be determined with a Micromeritics "SEDIGRAPH® 5100" particle size analyzer.

Figure 6:
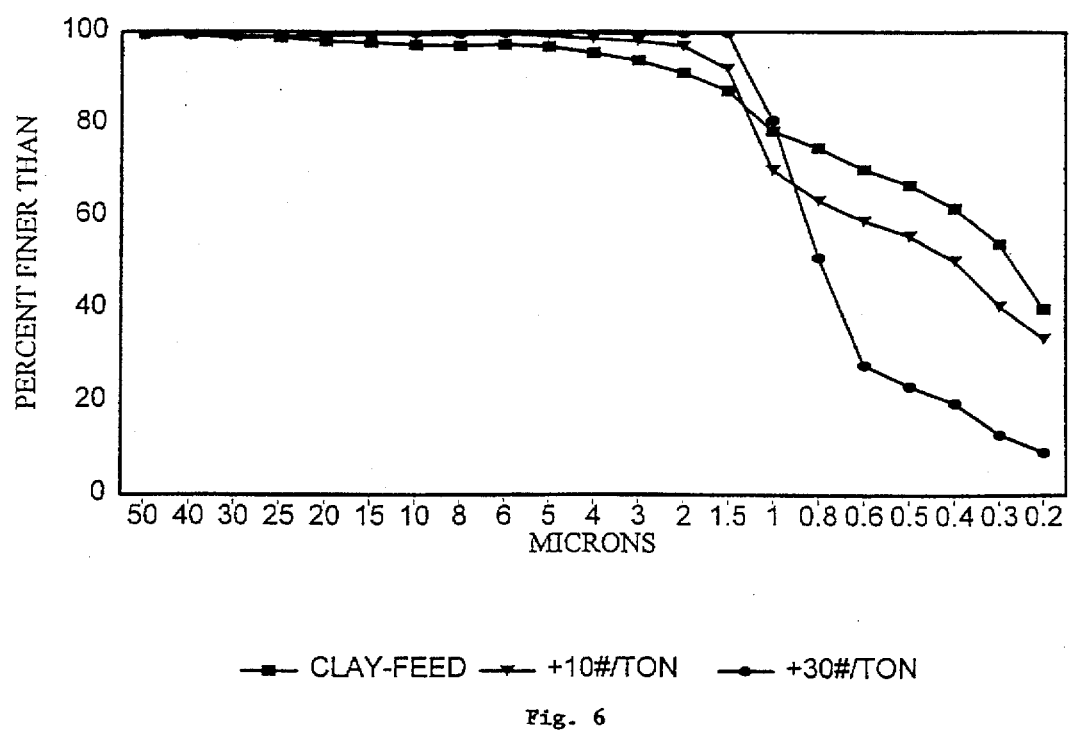
FIG. 6 is a graph of particle size in microns versus the percent of particles finer than the stated sizes which illustrates the effect of adding 10 lbs/t and 30 lbs/t of the high molecular weight cationic polyelectrolyte, Westcat E-F, on the particle size distribution curve of a 10% solids dispersion of Windsor kaolin clay.

Results are illustrated in FIG. 6. As the amount of cationic starch added is increased, general flocculation of all of the particles present in the feed mineral slurry takes place. The mean mineral particle size is increased at higher cationic starch doses. At 10 lbs/t cationic starch treatment level there are still 33 percent by weight of particles finer than 0.2 microns present in the mineral slurry. At 30 lbs/t cationic starch addition to a 10% solid mineral particle slurry there are still 23 percent by weight of particles finer than 0.5 microns and 9 percent by weight of particles finer than 0.2 microns present in the mineral slurry. Thus, selective aggregation does not occur when using high molecular-weight agents.

The present invention has been described in connection with preferred embodiments and multiple examples. It will be understood that the invention is not limited to those embodiments. On the contrary, the invention covers all alternatives, modifications, and equivalents as may be included within the spirit and scope of the invention as defined by the following claims.

I claim:

1. A method for producing fillers for cellulosic products, comprising:

providing an anionically dispersed aqueous slurry comprising from about 1 percent to about 30 percent solid mineral particles by weight, the mineral particles being selected from the group consisting of kaolin, talc, aluminum trihydrate and mixtures thereof, the slurry containing fine particles and having a bulk negative charge; and adding at least 5 pounds of a low-molecular-weight cationically charged aggregating agent, per ton of mineral particles, to the dispersed aqueous slurry to selectively aggregate fine and ultra-fine particles present in the dispersed slurry.

2. The method of claim 1 wherein the mineral particles comprise kaolin.

3. The method of claim 1 wherein the dispersed slurry has from about 1 percent to about 15 percent solids by weight.

4. The method of claim 1 wherein the dispersed slurry has from about 10–15 percent solids by weight.

5. The method of claim 1 wherein the dispersed slurry of mineral particles is anionically dispersed with a compound selected from the group consisting of a polyacrylic acid homopolymer, polyacrylic acid copolymer, methacrylic acid copolymers, carboxylic acid containing copolymers, sulfonic acid copolymers, tetrasodium pyrophosphate, tri polyphosphate, polyphosphates, sodium silicate and mixtures thereof.

6. The method of claim 1 wherein the dispersed slurry is anionically dispersed with tetrasodium pyrophosphate.

7. The method of claim 1 wherein, prior to adding the aggregating agent, at least about 70% by weight of the mineral particles have an equivalent spherical diameter of less than about two microns.

8. The method of claim 1 wherein, prior to adding the aggregating agent, at least about 70% by weight of the mineral particles have an equivalent spherical diameter of less than about 2 microns with at least 35% of the mineral particles have an equivalent spherical diameter of less than 0.3 microns.

9. The method of claim 1 wherein the low-molecular-weight aggregating agent is selected from the group consisting of alkyl diallyl quaternary ammonium salts, quaternary ammonium cationic polymers obtained by copolymerizing aliphatic secondary amines with epichlorohydrin, poly (quaternary ammonium) polyether salts that contain quaternary nitrogen in a polymeric backbone chain extended by ether groups, polyamines, copolymers of acrylamide with cationic vinyl monomers, dimethylamine epichlorohydrine copolymers, dimethyldiallylammonium chloride homopolymer, dimethyldiallylammonium chloride copolymer, divalent metal ion salts, trivalent metal ion salts polyethyleneimine polyelectrolytes and mixtures thereof.

10. The method of claim 1 wherein the low-molecular-weight aggregating agent comprises dimethydiallyl ammonium chloride homopolymer.

11. The method of claim 9 wherein the divalent metal ion salt is selected from the group consisting of calcium, magnesium, nickel, manganese, copper, zinc and tin salts and mixtures thereof.

12. The method of claim 9 wherein the divalent metal ion salt is selected from the group consisting of magnesium chloride, calcium chloride, magnesium hydroxide, calcium hydroxide, magnesium nitrate, calcium nitrate and mixtures thereof.

13. The method of claim 9 wherein the trivalent metal ion salt is selected from the group consisting of aluminum, iron, chromium and titanium salts and mixtures thereof.

14. The method of claim 9 wherein the trivalent metal ion salt is selected from the group consisting of aluminum sulphate, polyaluminum chloride and sodium aluminate and mixtures thereof.

15. The method of claim 1 wherein the aggregating agent is added to the dispersed aqueous slurry of mineral particles in an amount of at least about 20 pounds aggregating agent per ton of mineral particles.

16. A filler for filling paper or paper board, the filler being produced according to the process of claim 1.

17. The filler of claim 16 wherein the mineral particles comprise kaolin.

18. A method for producing filler for filling paper and paper board, comprising:

providing an aqueous slurry comprising from about 1 percent to about 30 percent solids by weight of kaolin;

adding an anionic dispersing agent to the slurry to disperse the mineral particles, thereby producing dispersed aqueous suspension of mineral particles, the dispersed aqueous suspension having a bulk negative charge; and adding a low-molecular-weight aggregating agent to the dispersed aqueous suspension in an amount of at least 5 pounds aggregating agent per ton of mineral particles to selectively aggregate the fine and ultra-fine particles present in the dispersed aqueous slurry, the aggregating agent having a positive charge.

19. The method of claim 18 wherein the dispersed aqueous suspension comprises from about 10 percent to about 15 percent solids by weight.

20. The method of claim 18 wherein the anionic dispersing agent comprises tetrasodium pyrophosphate.

21. The method of claim 18 wherein the aggregating is selected from the group consisting of alkyl diallyl quaternary ammonium salts, quaternary ammonium cationic polymers obtained by copolymerizing aliphatic secondary amines with epichlorohydrin, poly (quaternary ammonium) polyether salts that contain quaternary nitrogen in a polymeric backbone chain extended by ether groups, polyamines, copolymers of acrylamide with cationic vinyl monomers, dimethylamine epichlorohydrine copolymers, dimethyldiallylammonium chloride homopolymer, dimethyldiallylammonium chloride copolymer, divalent metal ion salts, trivalent metal ion salts polyethyleneimine polyelectrolytes and mixtures thereof.

22. A method for producing fillers for paper and paper board, comprising:

providing an anionically dispersed aqueous slurry comprising from about 1 percent to about 15 percent kaolin mineral particles by weight; and adding at least 5 pounds of a cationic aggregating agent, per ton of kaolin, to the dispersed aqueous slurry to selectively aggregate fine and ultra-fine particles present in the dispersed aqueous slurry, the aggregating agent being selected from the group consisting of alkyl diallyl quaternary ammonium salts, quaternary ammonium cationic polymers obtained by copolymerizing aliphatic secondary amines with epichlorohydrin, poly (quaternary ammonium) polyether salts that contain quaternary nitrogen in a polymeric backbone chain extended by ether groups, polyamines, copolymers of acrylamide with cationic vinyl monomers, dimethylamine epichlorohydrine copolymers, dimethyldiallylammonium chloride homopolymer, dimethyldiallylammonium chloride copolymer, divalent metal ion salts, trivalent metal ion salts polyethyleneimine polyelectrolytes and mixtures thereof.

23. The method of claim 22 wherein the step of providing an anionically dispersed aqueous slurry comprises adding an anionic dispersing agent to a suspension of kaolin mineral particles.

24. The method of claim 22 wherein the low-molecular-weight aggregating agent comprises dimethyldiallylammonium chloride homopolymer.

25. A filler for paper and paper board, the filler being produced according to the process of claim 22.

26. A method for producing fillers for paper and paper board comprising:

providing a dispersed aqueous slurry comprising from about 1 percent to about 10 percent kaolin; and adding at least 5 pounds of dimethyldiallyl-ammonium chloride homopolymer per ton of kaolin to the dispersed aqueous slurry to selectively aggregate the fine and ultra-fine particles present in the dispersed aqueous slurry.

27. A process for making paper or paper board, the process comprising:

providing an anionically dispersed aqueous slurry comprising from about 1 percent to about 30 percent kaolin mineral particles by weight;

adding at least 5 pounds of a low-molecular-weight cationic aggregating agent per ton of mineral particles to the dispersed aqueous slurry to selectively aggregate fine and ultra-fine particles present in the dispersed slurry and form aggregated particles;

adding the resulting slurry which contains aggregated particles to an aqueous cellulose pulp slurry to provide a paper making slurry;

forming the paper making slurry into a sheet; and drying the sheet to provide a paper or paper board material.

28. A process for making paper or paper board, the process comprising:

providing a concentrated aqueous slurry comprising more than 30 percent mineral particles by weight;

shipping the concentrated slurry from a central manufacturing location to the site of a paper mill;

providing an anionic dispersing agent in the aqueous slurry, before or after the shipping, to form an anionically dispersed aqueous slurry;

at the site of the paper mill, adding water to the aqueous slurry, before or after the dispersing agent is provided in the aqueous slurry, to form a dilute anionically dispersed aqueous slurry comprising from about 1 percent to about 30 percent mineral particles by weight;

adding at least 5 pounds of a low-molecular-weight cationic aggregating agent per ton of mineral particles to the dilute slurry to selectively aggregate fine and ultrafine mineral particles and form a slurry of aggregated particles;

combining the resulting slurry which contains aggregated particles with a cellulosic pulp to provide a paper making slurry;

forming the paper making slurry into a sheet; and drying the sheet to provide a paper or paper board material.

* * * * *